(12) United States Patent
Kowalczyk

(10) Patent No.: US 9,724,844 B1
(45) Date of Patent: Aug. 8, 2017

(54) SCREWS FOR A CARBONIZING MACHINE

(76) Inventor: James E. Kowalczyk, Saginaw, MI (US)

( * ) Notice: Subject to any disclaimer, the term of this patent is extended or adjusted under 35 U.S.C. 154(b) by 1146 days.

(21) Appl. No.: 13/373,019

(22) Filed: Nov. 2, 2011

Related U.S. Application Data

(60) Provisional application No. 61/456,250, filed on Nov. 3, 2010.

(51) Int. Cl.
*B29B 7/48* (2006.01)

(52) U.S. Cl.
CPC .............. *B29B 7/482* (2013.01); *B29B 7/48* (2013.01)

(58) Field of Classification Search
None
See application file for complete search history.

(56) References Cited

U.S. PATENT DOCUMENTS

| | | | | |
|---|---|---|---|---|
| 3,195,868 A | * | 7/1965 | Loomans | B29B 7/483 366/291 |
| 3,719,350 A | * | 3/1973 | Loomans | B29B 7/482 366/75 |
| 4,136,968 A | * | 1/1979 | Todd | B29B 7/488 366/85 |
| 4,744,669 A | * | 5/1988 | Kowalczyk | B29B 7/48 222/413 |
| 4,752,135 A | * | 6/1988 | Loomans | B29B 7/482 366/297 |
| 4,826,323 A | * | 5/1989 | Loomans | B29B 7/482 366/301 |
| 4,908,104 A | * | 3/1990 | Loomans | C10B 47/44 201/25 |
| 5,017,269 A | * | 5/1991 | Loomans | C10B 7/10 201/25 |
| 7,748,479 B2 | * | 7/2010 | Barbera | E21B 10/44 175/323 |

* cited by examiner

*Primary Examiner* — Thomas Randazzo

(57) ABSTRACT

Screws for a carbonizing machine for carbonizing organic material into useful char product.

3 Claims, 20 Drawing Sheets

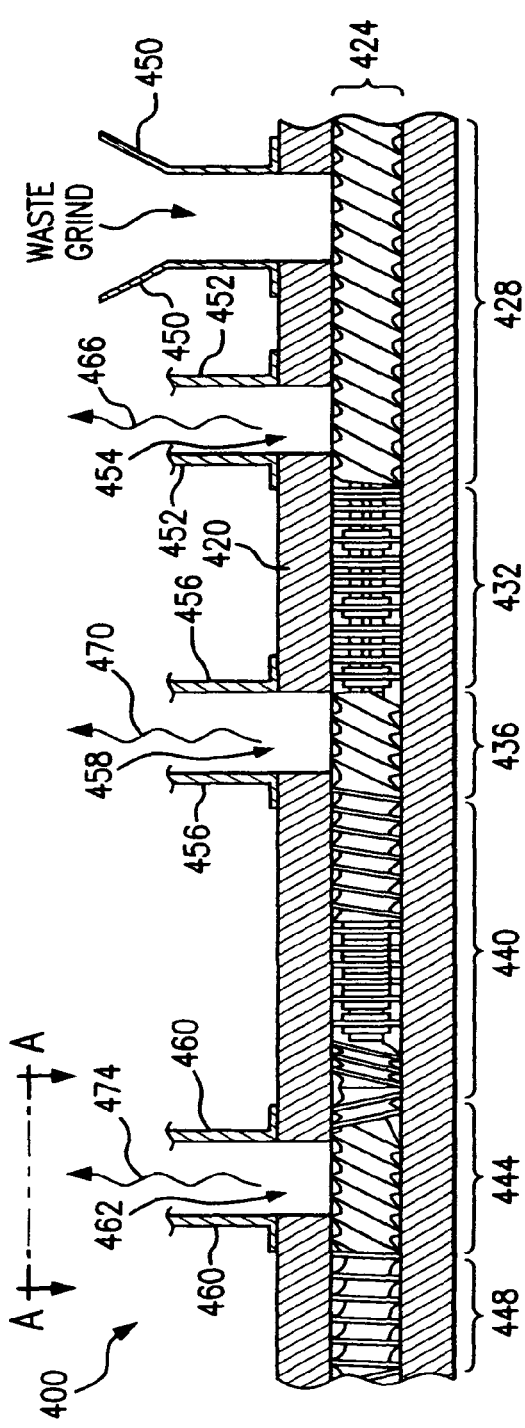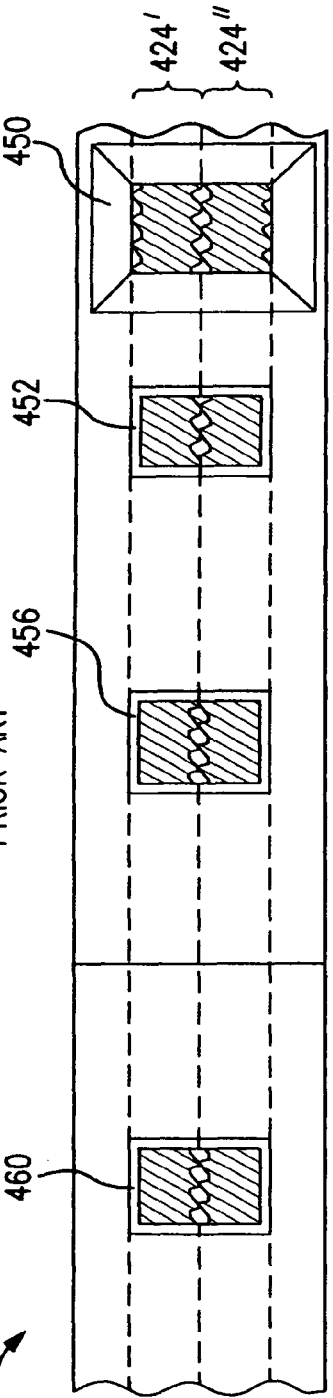
FIG. 1
PRIOR ART
FIG. 2
PRIOR ART

SCREWS FOR A CARBONIZING MACHINE

This application claims priority from U.S. Provisional patent application Ser. No. 61/456,250, filed Nov. 3, 2010 the entirety of which is incorporated herein. The invention disclosed and claimed herein relates to unique screws for a carbonizing machine for carbonizing organic materials.

BACKGROUND OF THE INVENTION

The apparatus disclosed herein involves certain novel, useful, and unobvious screw improvements to a machine used to convert organic material into a char material through a process of carbonizing or pyrolysis.

Conversion of municipal solid waste by incineration has become objectionable due to the release of fumes and smoke that contribute to pollution. In addition, incineration plants typically require additional inputs of expensive energy yet fail to recover useful products that could offset the cost of incineration. Burying municipal solid waste in landfill areas is also objectionable due to the tremendous volumes of waste generated and the scarcity of landfill areas.

Municipal waste and other biomass may be converted to energy and useful products by a carbonizing process as disclosed, for example, in U.S. Pat. No. 5,017,269 to Loomans et al, which is incorporated by reference for what it teaches about the process and the prior art equipment. Organic material is subjected to a sequence of mechanical compressions, intensive mixing, and decompressions in a continuous, twin screw reactor under adiabatic conditions. The intensive mixing subjects the organic material to frictional and viscous shear forces that create heat build up and particle attrition sufficient to change the phase of the particles and to convert their form. This is in contrast to extensive mixing which merely creates a most homogenous distribution of neat ingredients without changing them or converting their form. As a result of the carbonizing process, the organic material gives up volatile hydrocarbons, which may be captured or combusted immediately to provide energy to power the conversion apparatus.

Further, at the end of the process, the organic material is completely converted into a char material of exceptional quality that may be sold as a replacement for, or supplement to, high-grade coal.

Referring now to FIGS. 1 through 2, an exemplary carbonization machine is shown in greater detail. FIG. 1 shows the exemplary carbonizing machine 400 in cross-sectional view. FIG. 2 shows a top view of the carbonizing machine. FIGS. 1 and 2 only show a portion of the overall carbonizing machine 400, focusing on the portion of the machine from an organic material input hopper 450 to just beyond a third gas vent 460. It should be understood by reference to the Loomans et al patent set forth Supra, that the carbonizing machine 400 will further include an opening to output converted char material, among other features.

Referring now particularly to FIG. 1, the carbonizing machine 400 includes dual screws 424 in a chassis 420. The dual screws 424 extend through the chassis 420 by traversing a series of barrel sections 428, 432, 436, 440, 444, and 448. The dual screws 424 take on several distinct, complex, and complimentary screw and paddle designs and orientations. Generally, the dual screws 424 are designed and oriented to perform the tasks of (1) moving the organic material in a leftward direction from the input hopper 450, (2) imparting work energy into the organic material through shredding, chopping, grinding, intensive mixing, and compression to thereby heat the organic material, (3) maintaining near adiabatic conditions, and (4) staging the outflow of gases from the organic material to thereby perform a controlled and highly repeatable conversion into char.

Immediately downstream of the second barrel section is a third barrel section. Here, the dual screws are helical advancing screw design as in the first barrel section. As a result, the organic material advances more rapidly and is, therefore, decompressed. By allowing the material to "relax," it does not flow out of a second opening in the chassis. Immediately downstream of the third barrel section is a fourth barrel section. The dual screws transition to helical screw sections of decreased pitch such that the organic material begins to recompress. The dual screws then transition to, for example, radially abutting paddles that are progressively axially angularly out of phase or offset to the screw shaft. As a result, the organic material is further chopped, densified, intensively mixed, and compressed. By this point in the process, the organic material typically takes on a dark brown color and reaches a temperature in excess of 450 degrees F.

At the downstream end of the fourth barrel section, the dual screws abruptly transition to reverse hand such that the forward flowing organic material meets itself in reverse flow. As a result, the material is effectively worked against itself to significantly increase the work energy input and to highly compress the material. The material is heated sufficiently to drive off lighter volatiles (hydrocarbons). However, with the organic material so highly compressed, another vapor block is formed at the downstream end of the fourth barrel section. Therefore, the lighter volatiles flow back upstream into the third barrel section. The lighter volatiles are released, as the second vented gas, through the second opening in the chassis. A second duct vents the second gas, which may be combusted, to provide energy to drive the dual screws or it may be condensed for other uses.

Organic material, such as municipal solid waste (MSW), is shredded, ground, and dried before it is fed into a first barrel section 428 of the machine 400 through a feed port hopper 450. In the first barrel section 428, for example, the dual screws 424 are helical with lenticular cross-sections and primarily designed to advance the organic material.

Immediately downstream of the first barrel section 428 is a second barrel region 432. In the second barrel region 432, the dual screws 424 transition to, for example, radially abutting paddles that are progressively axially angularly out of phase or offset to the screw shaft. In addition, axially adjacent paddles on each shaft are arranged in helical formation. Toward the downstream end of the second barrel section 432, the dual screws incorporate a reverse helical formation to exert a counter-stream flow force on the material. This counter-stream force causes the material to be further compressed.

As the organic material is chopped, intensively mixed, and compressed in the second barrel section 432, the material is heated by work energy. As the organic material traverses the second barrel section 432, it is heated to about 400 degrees F. Although the organic material is dried prior to input into the machine 400, it still typically includes residual moisture. The work energy heating in the second barrel section 432 is sufficient to drive off moisture as steam in the second barrel section 432. The helical and reverse helical designs in the dual screws 424 of the second barrel section 432 cause the organic material to become so highly compressed at the downstream end of the second barrel section 432 that a vapor block is formed. Therefore, the emitted steam is forced back upstream into the first barrel section 428. The steam is released as the first vented gas 466 through a first opening 454 in the chassis 420. A first duct 452 vents this steam 466, which may be routed to a heat recovery process.

Immediately downstream of the second barrel section 432 is a third barrel section 436. Here, the dual screws 424 return to a helical advancing screw design as in the first barrel section 428. As a result, the organic material advances more rapidly and is, therefore, decompressed. By allowing the material to "relax," it does not flow out of a second opening 458 in the chassis 420. Immediately downstream of the third barrel section 436 is a fourth barrel section 440. The dual screws 424 transition to helical screw sections of decreased pitch such that the organic material begins to recompress. The dual screws 424 then transition to, for example, radially abutting paddles that are progressively axially angularly out of phase or offset to the screw shaft. As a result, the organic material is further chopped, densified, intensively mixed, and compressed. By this point in the process, the organic material typically takes on a dark brown color and reaches a temperature in excess of 450 degrees F.

At the downstream end of the fourth barrel section 440, the dual screws 424 abruptly transition to reverse hand such that the forward flowing organic material meets itself in reverse flow. As a result, the material is effectively worked against itself to significantly increase the work energy input and to highly compress the material. The material is heated sufficiently to drive off lighter volatiles (hydrocarbons). However, with the organic material so highly compressed, another vapor block is formed at the downstream end of the fourth barrel section 440. Therefore, the lighter volatiles flow back upstream into the third barrel section 436. The lighter volatiles are released, as the second vented gas 470, through the second opening 456 in the chassis 420. A second duct 456 vents the second gas 470, which may be combusted, to provide energy to drive the dual screws, for example, or condensed for other uses.

Immediately downstream of the fourth barrel section 440 is a fifth barrel section 444. Here, the dual screws 424 return to a helical advancing screw design as in the first and third barrel sections 428 and 436. As a result, the organic material is again briefly decompressed to prevent out flow at a third opening 462 in the chassis 420. Immediately downstream of the fifth barrel section 444 is a sixth barrel section 448. The dual screws 424 again transition to helical screw sections of decreased pitch to cause recompression and heating. The dual screws 424 then transition, for example, to reverse hand to input significant work energy and highly compress the material. The material is heated sufficiently to drive off heavy volatiles (hydrocarbons). Another vapor block forms at the downstream end of the sixth barrel section 448 and forces the heavy volatiles back upstream into the fifth barrel section 444. The heavy volatiles are released, as the third vented gas 474, through the third opening 462 in the chassis 420. A third duct 460 vents the third gas 470, which may be routed to a combustion chamber. At the end of the sixth barrel section 448, the organic material reaches a temperature of about 600 degree F. At this point, the organic material is completely black and bears a charcoal-like appearance.

The oxygen-free environment prevents the material, converted now to char, from igniting. A final cooling process is typically performed before the char is removed. As described above, the carbonizing machine 400 is specifically designed to prevent outflow of the solid organic material at the first, second, and third openings 454, 458, and 462. However, two types of problems are found to occur in the gas openings 454, 458, and 462 and the gas ducts 452, 456, and 460. First, the incoming organic material is very dry and not very dense. It is therefore commonly called fluff. It is found that steam backflow from the second barrel 432 can carry some of the organic material fluff up the first opening 454 along with the steam 466. The fluff then deposits on the sidewalls of the first opening 454 or the first duct 452. The deposited fluff is a brownish, fluffy layer that can obstruct the first opening 454 and first duct 452 if not removed.

Second, as described above, the lighter and heavy volatile oils are released from the second opening 458 and the third opening 462, respectively, as the second gas 470 and third gas 474. The lighter volatiles are typically heated to between about 380 degrees and 400 degrees F. The heavy volatiles are typically heated to between about 520 degrees and 540 degrees F. The ambient temperature surrounding the machine 400 and the second and third ducts 456 and 460 is much lower. It is found that a portion of the gases 470 and 474 condenses on the sidewalls of the second and third openings 458 and 462 and on the second and third ducts 456 and 460. When the volatiles condense on the sidewalls of the openings and the ducts, any entrained particulate matter (such as the finely ground organic material) will easily stick to the sidewalls. As a result, the condensed lighter volatile matter forms a black, crusty layer. The condensed heavy volatile matter forms a black grease. Either deposit can obstruct the second or third opening 458 and 462 and second or third duct 456 and 460 if not removed.

Referring now to FIG. 2, a top view of the exemplary carbonizing machine 400 is shown. Portions of the dual screws 424' and 424" may be seen in this Figure. The dual screws 424' and 424" run the length of the machine 400. The hopper 450 is located over the dual screws 424' and 424" so that inputted organic material is captured and then transferred downstream by the screws. The first vent 452 is located over the dual screws 424' and 424" toward the end of the first barrel section. The second vent 456 is located over the dual screws 424' and 424" in the third barrel section. The third vent 460 is located over the dual screws 424' and 424" in the fifth barrel section.

Referring now to FIG. 3, a cross-sectional view of a carbonizing machine 414, taken through line A-A of FIG. 1, shows the material deposition problem as found in the prior art. An opening 484 is positioned to release gas 486 from a barrel. However, material 480 is deposited on the sidewalls of the opening 484 in the chassis 420 or on the duct 482. This deposited material 480 may be the organic material fluff carried by released steam, as in the first opening of the carbonizing machine 400 of FIGS. 1 and 2, or condensed volatile and particulate matter, as in the second and third openings of the carbonizing machine 400 of FIGS. 1 and 2. Preventing the escape of these materials into the vents and preventing buildup of deposited material 480 is a pressing and unmet need in the art.

Looking at the typical cross section of a bi lobed twin screw mixer screw profile (FIG. 4), we discover that the cross section is typically a football shape where in one of the co-rotating twin screw bi-lobe geometries is described by the mating screw as they are conjugal as described in an earlier U.S. Pat. No. 3,195,868_B. Loomans et al and U.S. Pat. No. 3,198,491_B. Loomans et al, Example #1.

One problem with the current design of the system described in U.S. Pat. No. 5,017,269 to Loomans et al, is the transition from the free flowing geometries to those that create the compression and work energy that goes into the materials. These transitions are abrupt and create dams in the continuous processor that typically obstruct the forward flow of material and materially contribute to the back flow of particulate solids back into the venting area.

There are two conditions that promote the carry over and build up of particular solids in the feeding and venting areas. One of them is the velocity of the gas flow out the barrel openings (which if too high carries solids out with the gas phase) and the second is the restriction of forward flow of solid material down the barrel from the vents by abrupt changes in the screw geometry where the material transitions from a relaxed state to a compressed state (causing solid material to back up into the vent areas).

THE INVENTION

Thus, what is disclosed and claimed herein is a screw for a carbonizing machine. The screw is comprised of a linear shaft comprised of a predetermined length and number of multiple sections, wherein each section has a distinct configuration and orientation.

Each section comprises (A.) a standard helical screw; (B.) a helical advancing screw configuration; (C.) a helical screw configuration with a pitch of a lesser degree than the helical advancing screw configuration; (D.) a screw having radially abutting paddles that are progressively axially angularly out of phase with the screw linear shaft, and (E.) a screw having a reverse hand. The multiple sections are maintained in a predetermined order.

The screw is comprised of a linear shaft comprised of a predetermined length and number of multiple sections, wherein each section has a distinct configuration and orientation.

Thus, more specifically, each section comprises (A.) a helical advancing screw configuration of a higher open volume to provide for additional venting capacity of the system at a lower gas velocity, thereby increasing system throughput rates while reducing solids carry over in the vents; (B.) a helical screw configuration with a pitch that gradually and smoothly reduces to form a change in volume to a lesser degree than the helical advancing screw configuration to minimize material backflow into the venting section and increase the system capacity for throughput; (C.) a standard helical screw; (D.) a tight pitch single lead screw for initial compression of the process material; (E) a screw having radially abutting paddles that are progressively axially angularly out of phase with the screw linear shaft, and (F.) a screw having a reverse hand. The multiple sections are maintained in a predetermined order.

In another embodiment, there is the addition of an open volume longer lead feed screw with a square face and reinforced back flight in the first section to increase the volumetric capacity of the system while being able to absorb high mechanical loading from new uncompressed raw materials entering the machine, and in addition, there is a combination of two screws in tandem and in addition, there is a combination of two screws and a carbonizing machine.

BRIEF DESCRIPTION OF THE DRAWINGS

FIG. 1 is a cross-sectional view of a prior art carbonizing machine.

FIG. 2 is a top view of the prior art carbonizing machine.

DETAILED DESCRIPTION OF THE DRAWINGS

Details of the construction of a machine useful with the screws of this invention are disclosed in U.S. patent application Ser. No. 12/589,373, filed on Oct. 22, 2009 naming the inventors Fred L. Jones and James G. Kowalczyk, all of which is incorporated herein by reference to teach such machines and how they are constructed and operated.

Turning now to the invention herein, there are two conditions that promote the carry over and build up of particular solids in the feeding and venting areas. One of them is the velocity of the gas flow out of the barrel openings (which if too high carries solids out with the gas phase) and the second is the restriction of forward flow of solid material down the barrel from the vents, by abrupt changes in the screw geometry, where the material transitions from a relaxed state to a compressed state (causing solid material to back up into the vent areas).

The inventive screw geometry transition sections described in this application dramatically reduce the carry-over of particulate solids and solve the problem of high velocity carry over of particulate solids into the vent openings and from the feed opening.

Figure 3:
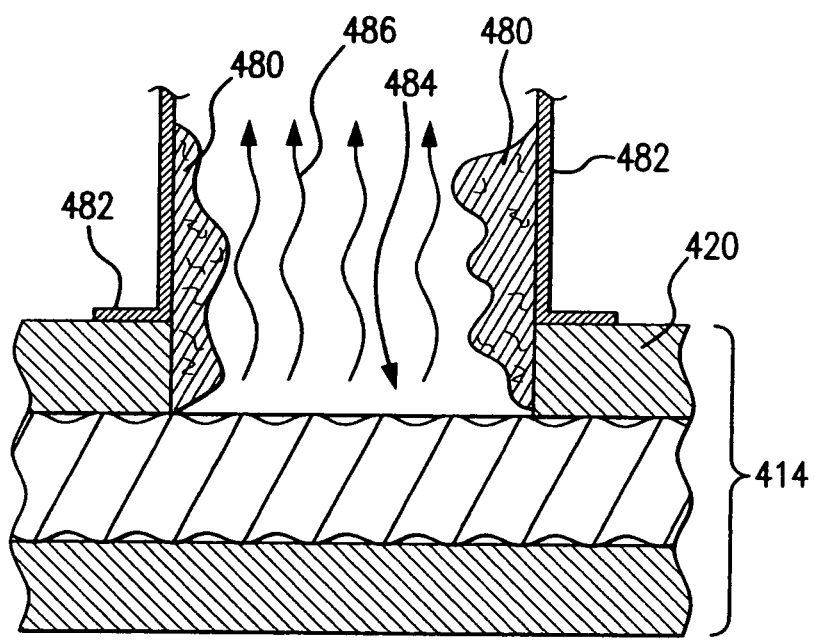
FIG. 3 is a cross-sectional view of a carbonizing machine showing the deposition problem of the prior art.
Figure 4:
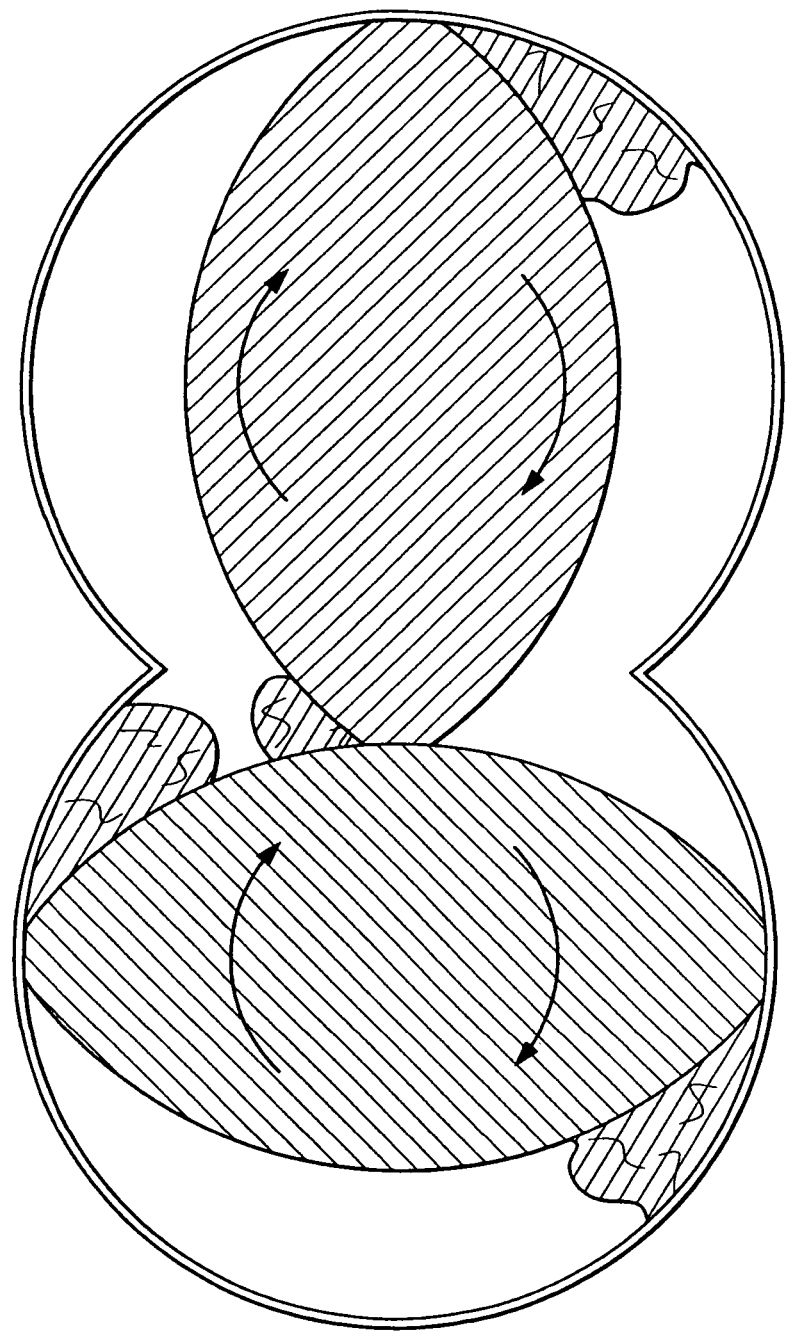
FIG. 4 is an end view showing the football shape of the typical twin lead (bi-lobe) twin screw cross sectional geometry.
Figure 5:
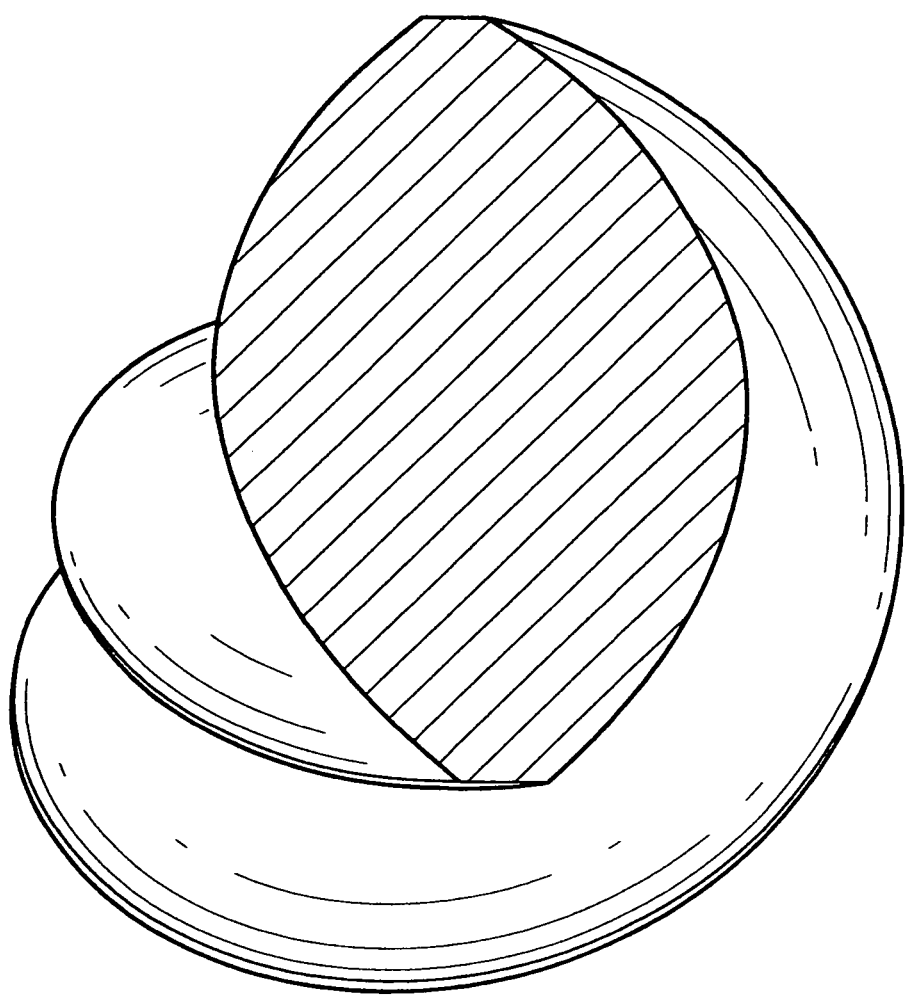
FIG. 5 is a cross section isometric of a standard bi-lobe twin screw twin lead geometry.
Figure 6:
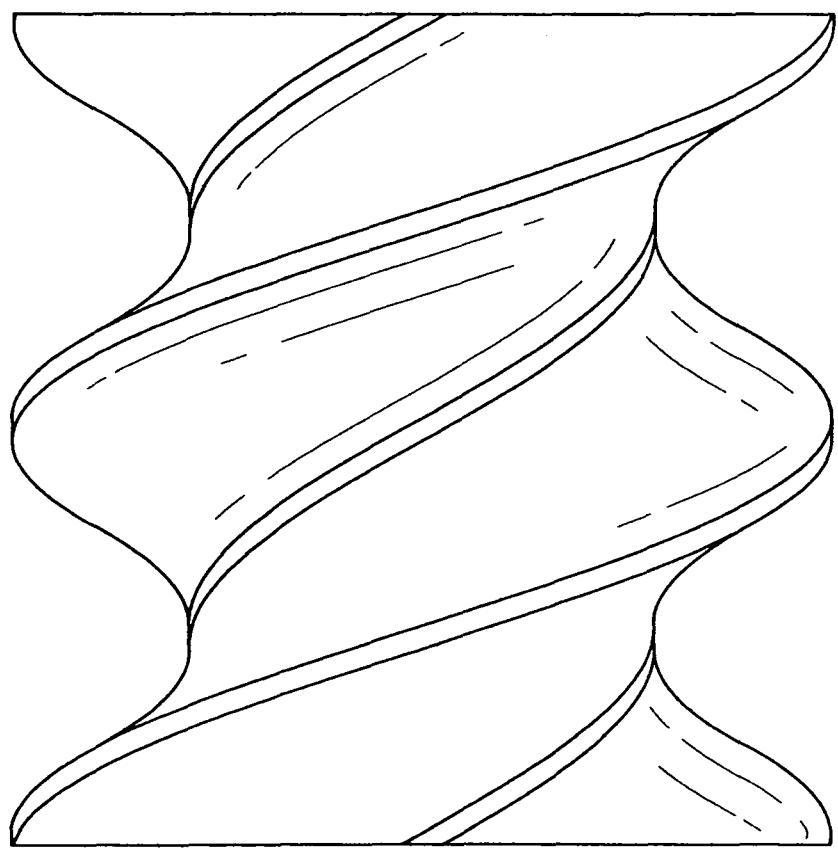
FIG. 6 is a full side view of a portion of a bi-lobe twin screw.

Looking at the typical cross section of a bi lobed twin screw mixer screw profile (FIG. 4), there is shown that the cross section is typically a football shape wherein one of the co-rotating twin screw bi-lobe geometries is described by the mating screw as they are conjugal as described in an earlier U.S. Pat. No. 3,195,868, B. Loomans et al and U.S. Pat. No. 3,198,491, B. Loomans et al, FIGS. 4, 5 and 6.

Figure 7:
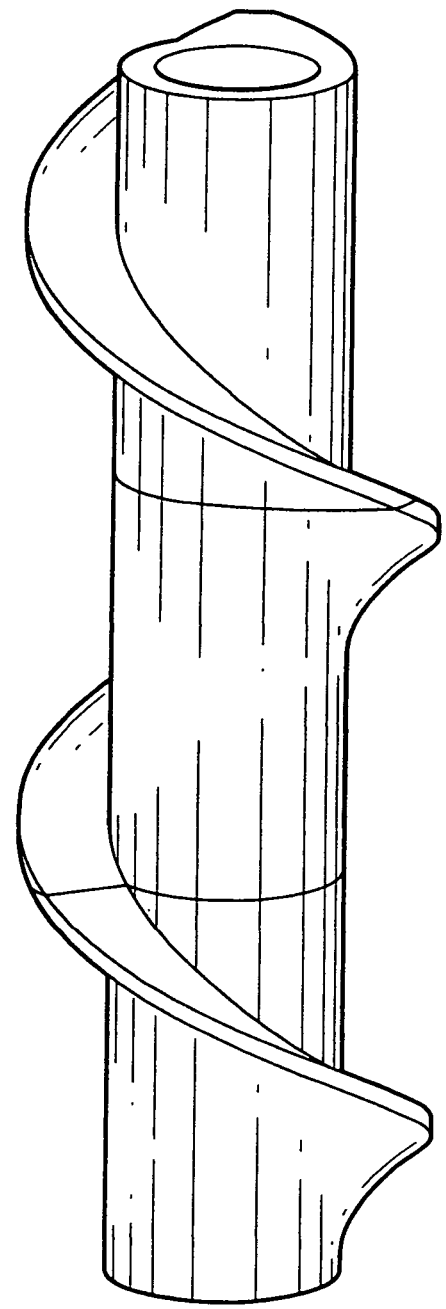
FIG. 7 is a full side view of a portion of FIG. 18 (check this against new Figures) showing a half single flight push screw for the feed port area.
Figure 8:
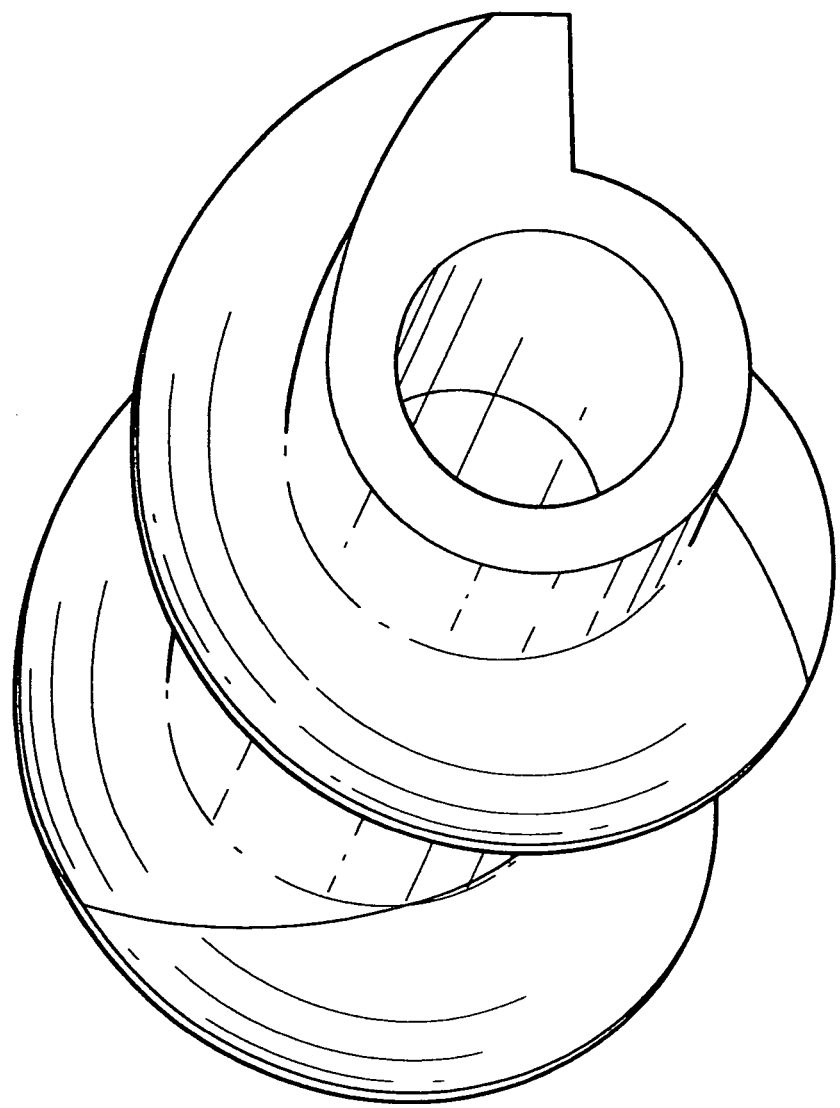
FIG. 8 is a full end view in perspective of a half single flight push screw.
Figure 9A:
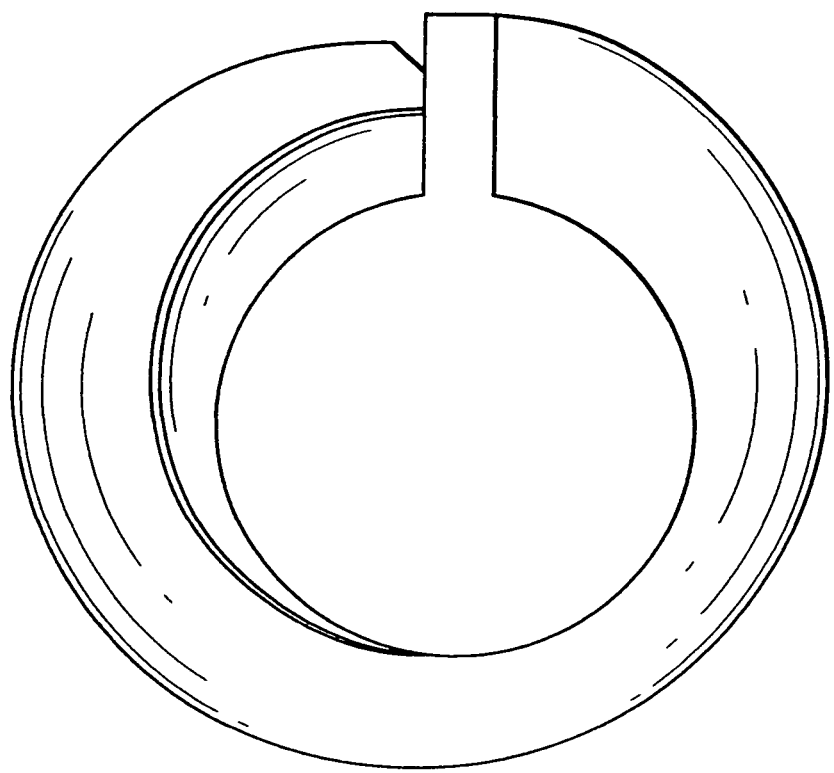
FIG. 9A is a full end view of a single square to standard twin lead transition of a screw of this invention.
Figure 9B:
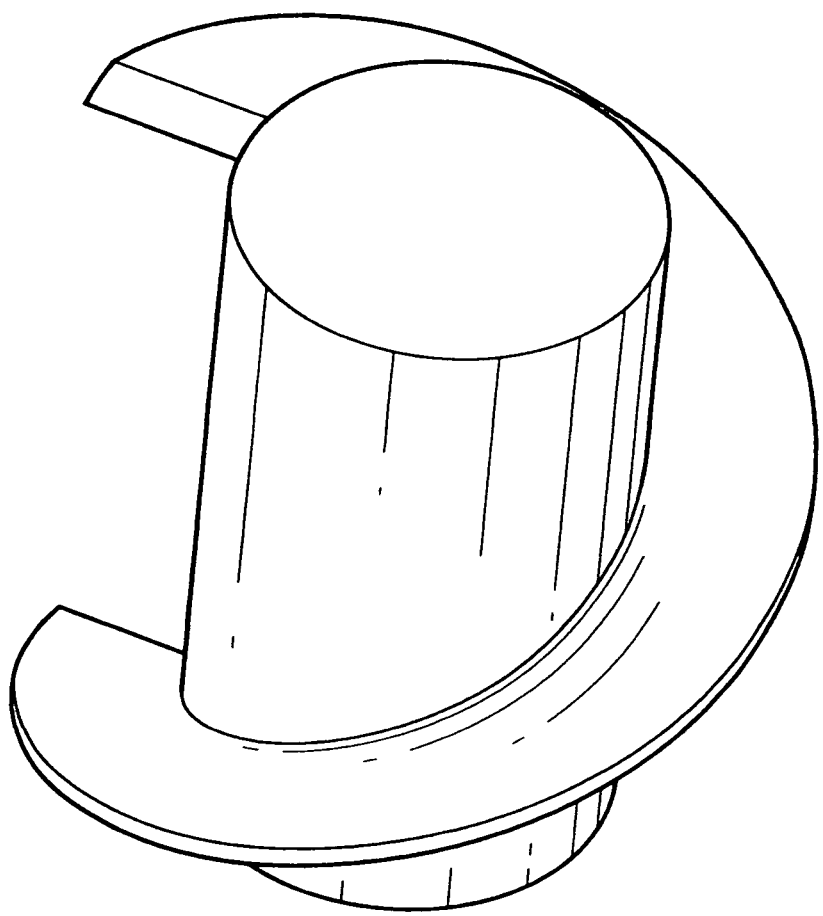
FIG. 9B is an isometric of one lead of twin lead squared flight RH lead.
Figure 10:
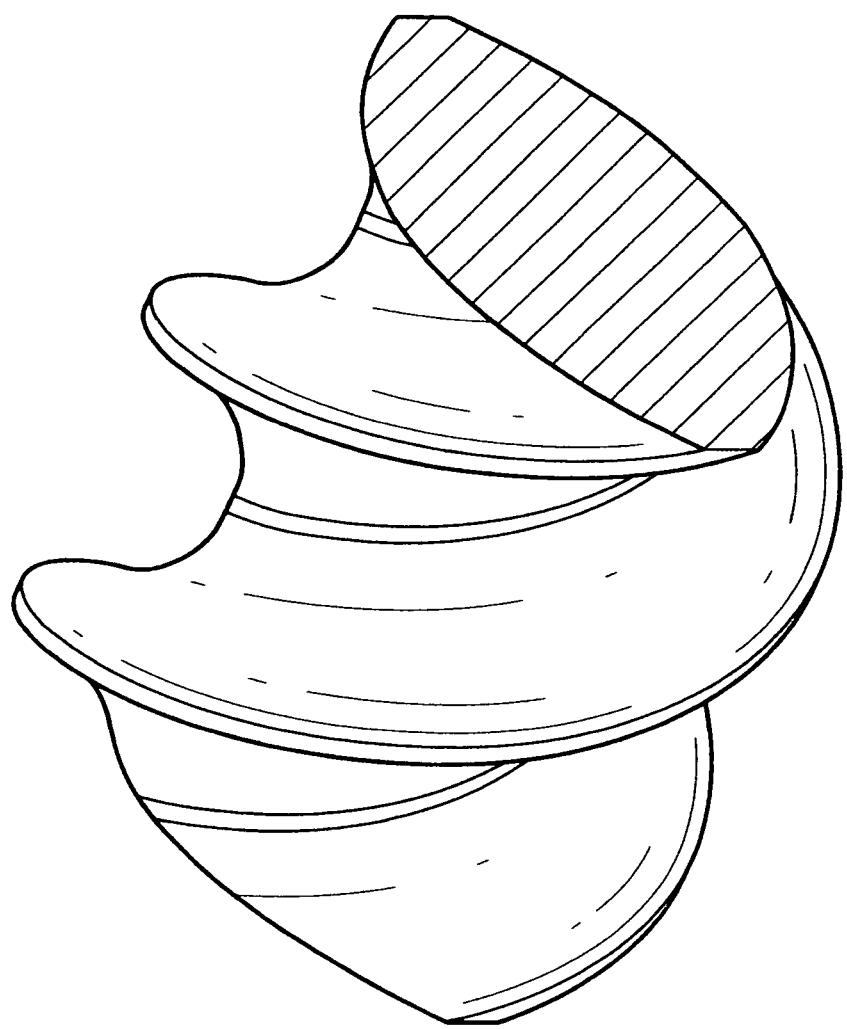
FIG. 10 is an isometric cross-section view of a portion of a screw which shows a bi-lobe twin screw.
Figure 11:
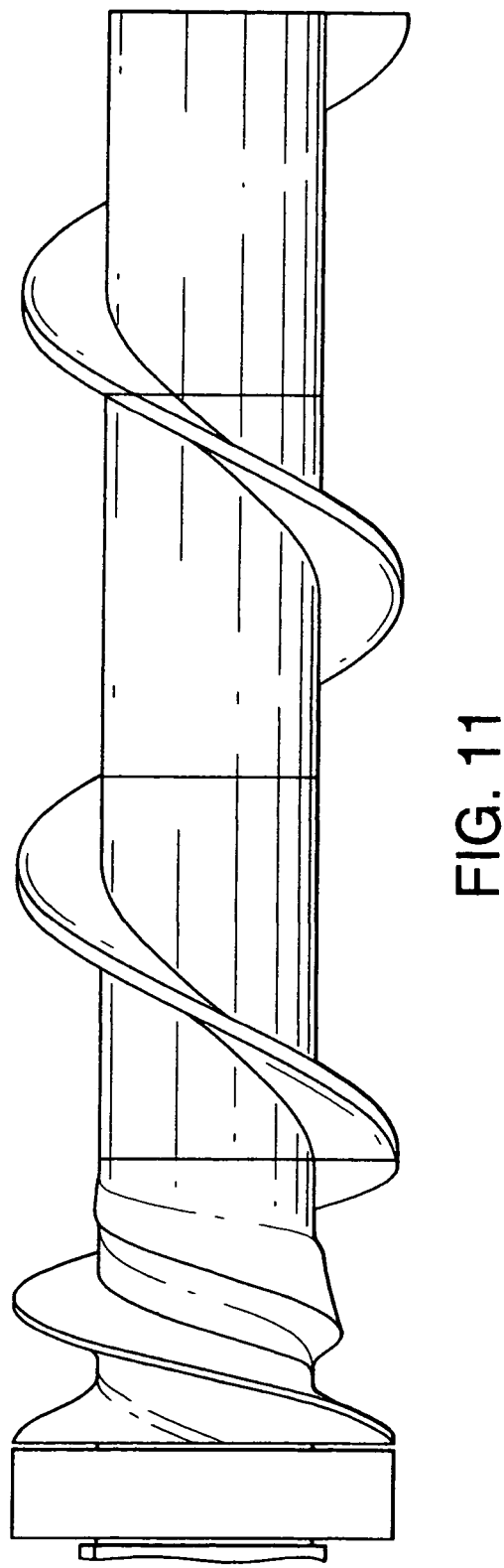
FIG. 11 shows twin half single flight push screw.

By modifying this screw geometry, which includes removing one lobe of the foot ball shape and creating a flat face on the forwarding edge of the other lobe (as shown in FIGS. 7 and 8 of this application), one can significantly reduce the volume in the barrel that is normally consumed by the missing metal of the screw. This greatly opens up the free volume in that area of the machine. In the extreme, the one lobe that remains can have metal removed from its trailing face increasing the open volume even further (as shown in FIG. 9). Additionally a typical twin lead feed screw (as shown in FIG. 10) has a lead equal to its diameter. That is the linear displacement of the spiral wrap of the individual screw flight to traverse 360 degrees of rotation is equal to the diameter of the screw. If one increases the lead of the screw, one increases the volumetric through put. This gives the screw more conveying capacity. Increasing the lead, however, diminishes the ability of the screw to overcome pressure drop, so there is a compromise in any process for the optimum screw lead. In this case, because of the interest in simple conveying, with no extrusion of the product in the feed or vent areas, the lead between 1.5 and 3 diameters would be optimized. The following equation shows the general values of the "A" term for a standard 2" diameter screw. $V_d = \frac{1}{2}(2P-1)F_dH_{max}Wv_{bz}$. The "A" term is the downstream volumetric conveying capacity of the screw. As the lead is increased the downstream conveying capacity (cubic inches per revolution) is increased also. However, beyond 45 degrees of helix angle (approximately a 3/1 lead) the "A" term begins to decrease due to back flow in the channel. Therefore against no back pressure the optimal lead would be 3 to 1. This is an increase in volumetric flow rate of 1.7 times over the standard 1 diameter lead. As one can observe, by modifying the screw flight to that as shown in FIG. 11 (example #3 (what's this?)) and using the increased lead of 3 to 1, the open volume screw can forward 2.2 times the volume of the standard feed screw.

Combined with a rectangular opening in the barrel (an opening wherein the length is proportionately longer than the width) rather than the original round openings described in the original patent, the velocity of the gas escaping from the vent is reduced dramatically, while the conveying capacity of the screw is increased dramatically.

Calculation sheet #1 shows the effect of both the open volume screw and the larger rectangular vents on a typical 2 inch twin screw machine. Graph #1 shows the reduction in velocity from the vent ports due to the larger open volume of the screw and the effect of the rectangular ports. This reduction in velocity greatly reduces the particulate solids that are carried out of the machine through the ports. These features also greatly increase the capacity of the system regardless of the throughput rates. The calculations are based on ports that are typically the width and length of the figure eight, essentially square ports. In the case for optimization, these ports will typically be the width of the figure eight bores and between 2 and 2.5 length to diameter ratios long.

Additionally to aid in retaining particulate solids in the machine while they are passing under the vent ports, as well as to aid initial feeding in the feed hopper area of the machine, the barrel and liner has a relief on the down swing side of the screw rotation to suck material into the machine and keep material from transgressing out the port openings.

Figure 12:
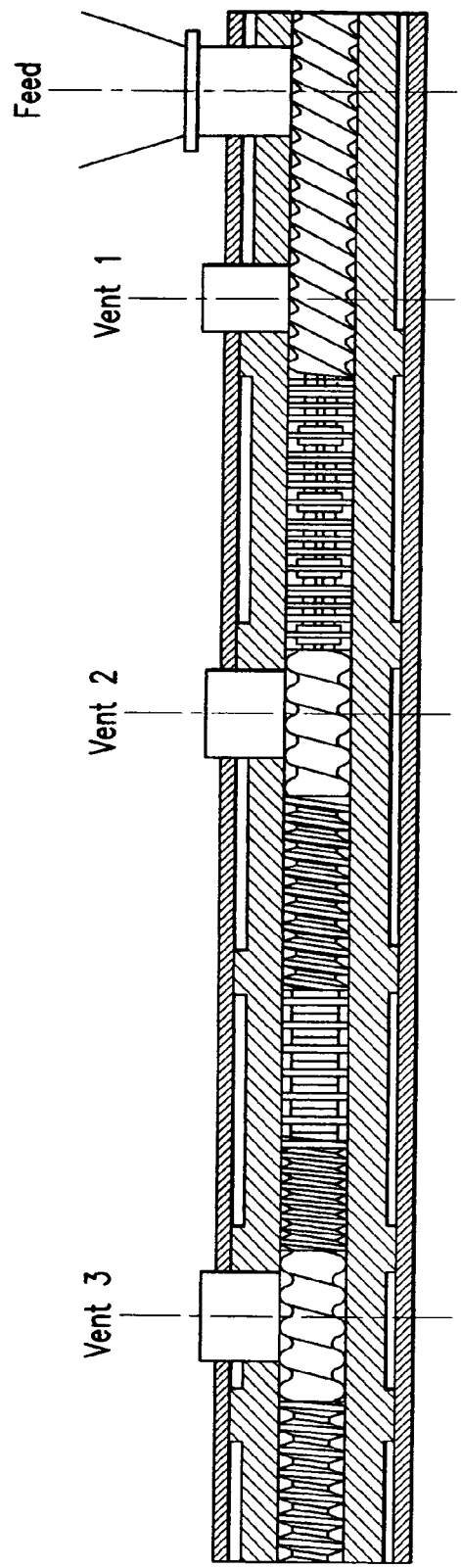
FIG. 12 is a schematic of a prior art machine known as the Loomans screw design based on the Loomans patents described Supra

One problem with the current system described in U.S. Pat. No. 5,017,269 to Loomans et al (as shown in FIG. 12), is the transition from the free flowing geometries to those that create the compression and work energy that goes into the materials. These transitions are abrupt and create dams in the continuous processor that typically obstruct the forward flow of material and materially contribute to the back flow of particulate solids back into the venting area. Changing the screw geometries to produce greater open volume under the feed and vent ports then going directly into the compression and energy dissipating screws of the original screw exacerbates the problem to an even greater extent.

Figure 13:
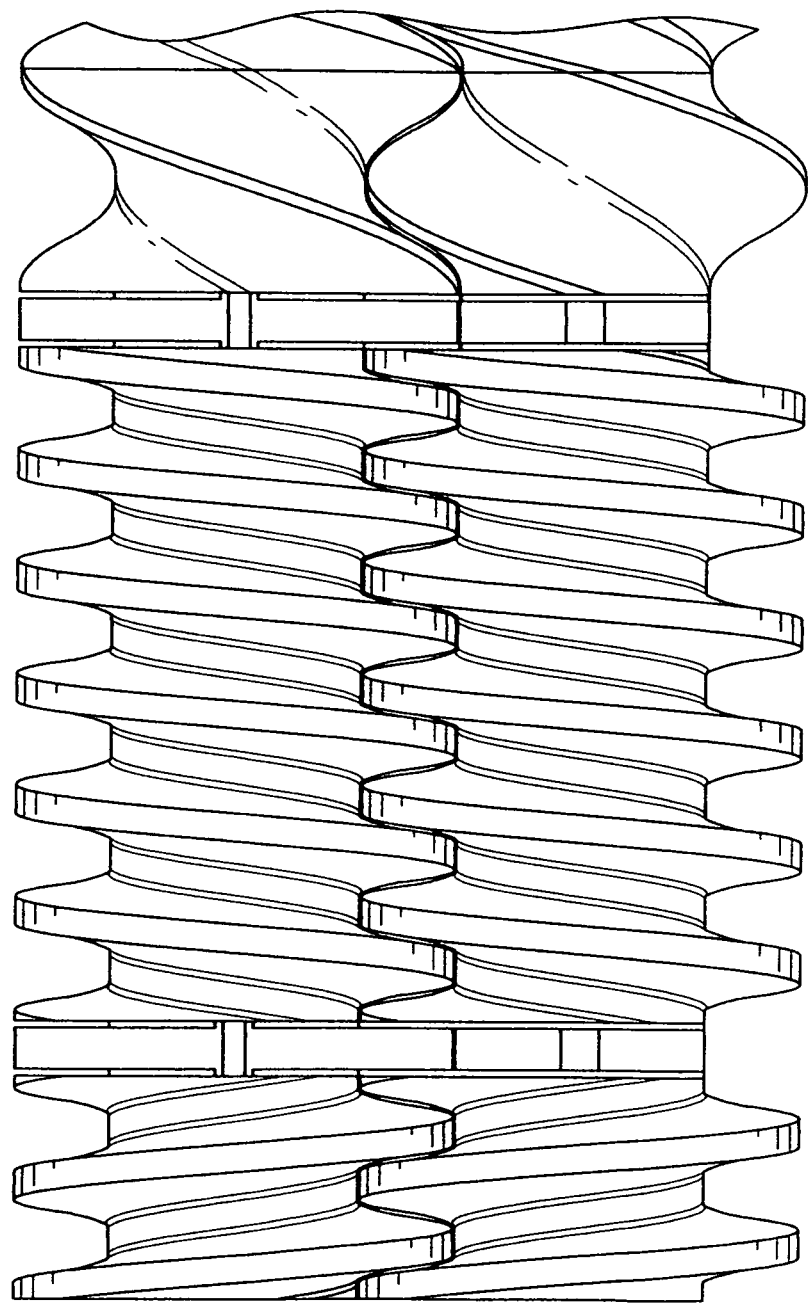
FIG. 13 is a partial assembly of the screw assembly at the discharge end showing the standard single flight discharge screws.
Figure 14:
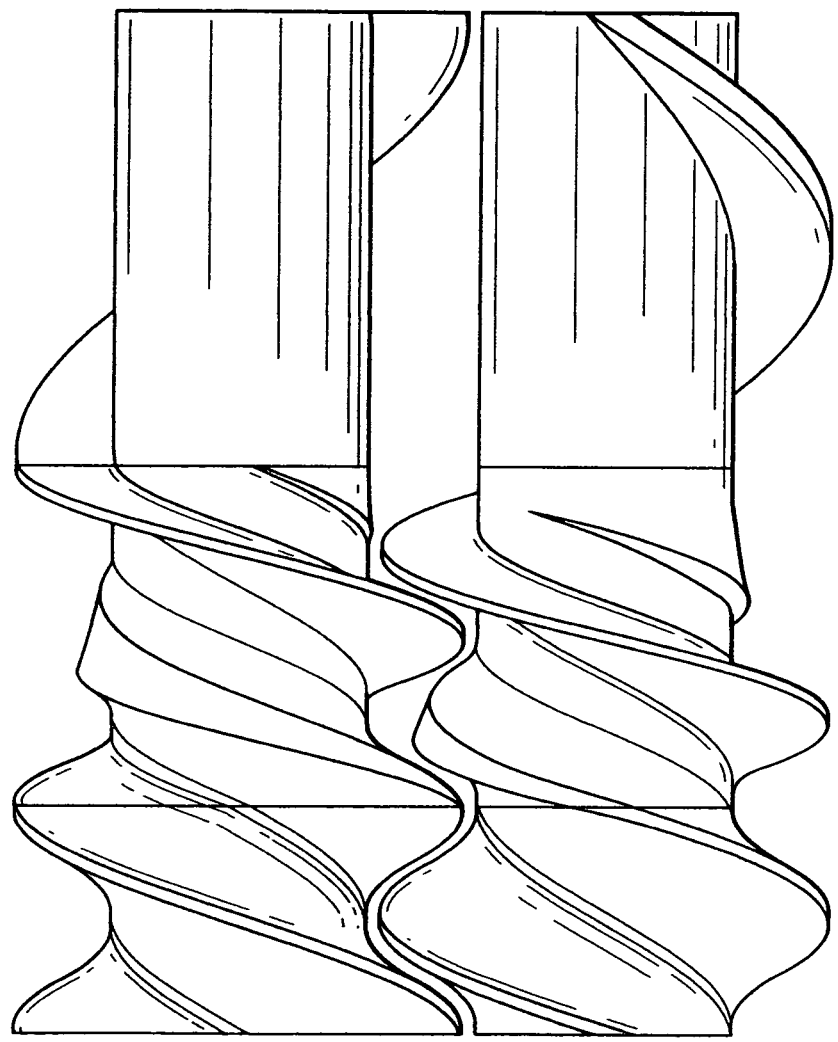
FIG. 14 is a partial assembly of 12 inch screws from the feed end, showing a full transition from square single flight to standard twin lead geometry.
Figure 15A:
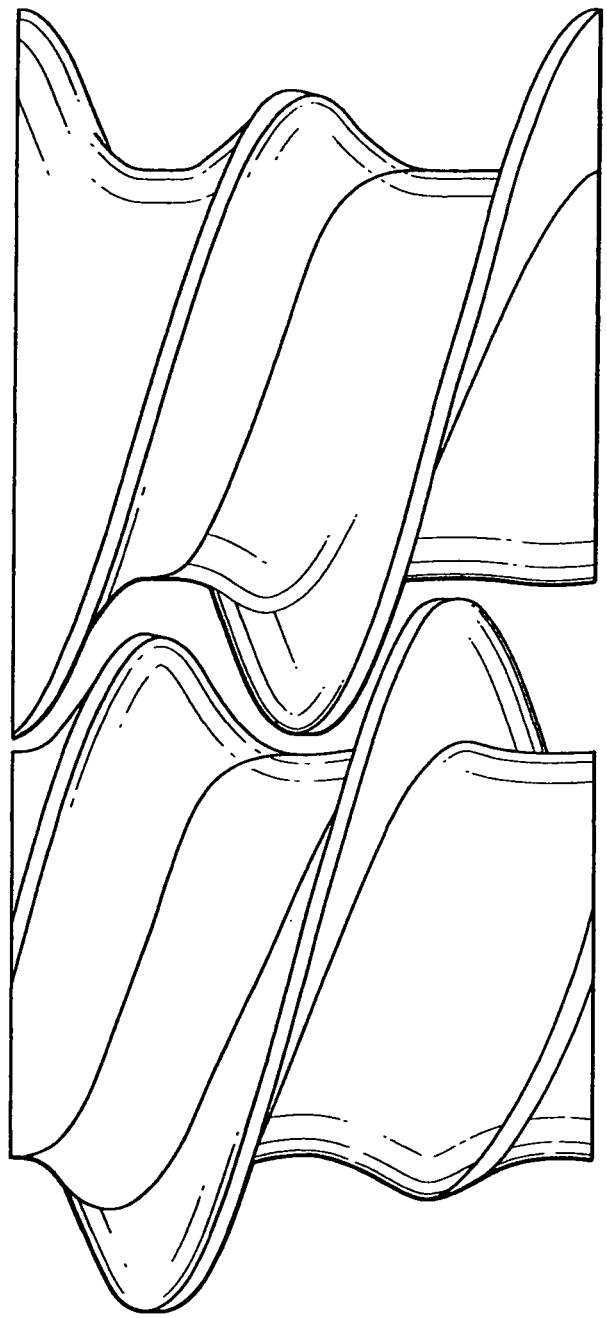
FIG. 15A is a view of the transition screw pair with 0.75 D of lead over 0.75 D of length rotating 360 degrees.
Figure 15B:
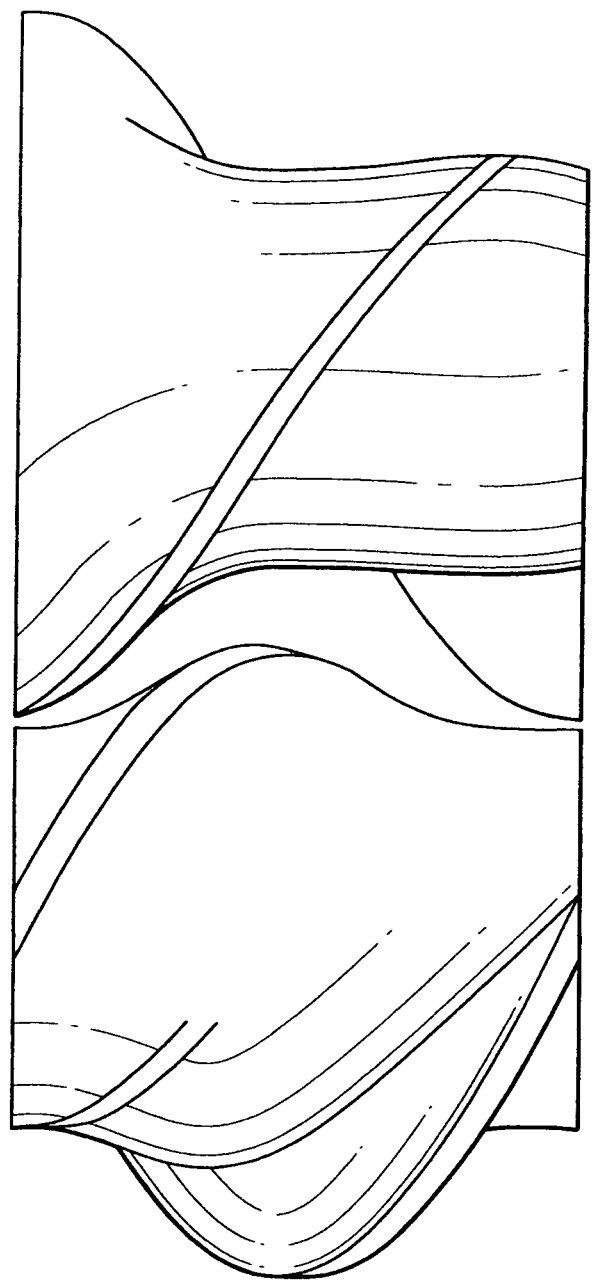
FIG. 15B is a view of a transition screw pair with 1.5 D of lead over 0.75 D of length rotating 180 degrees.
Figure 15C:
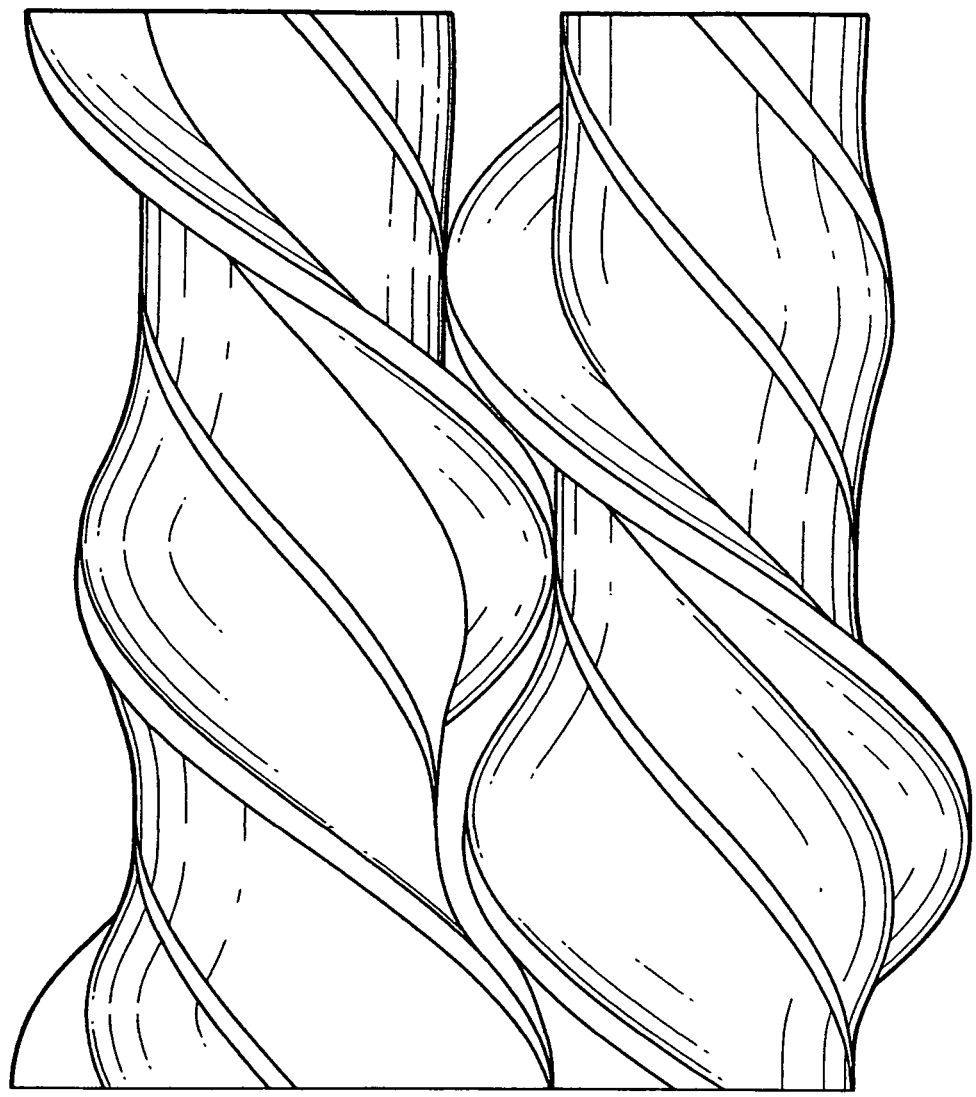
FIG. 15C is a view of a transition screw pair with 2.0 D of lead over 2.0 lead of length rotating 360 degrees.
Figure 16:
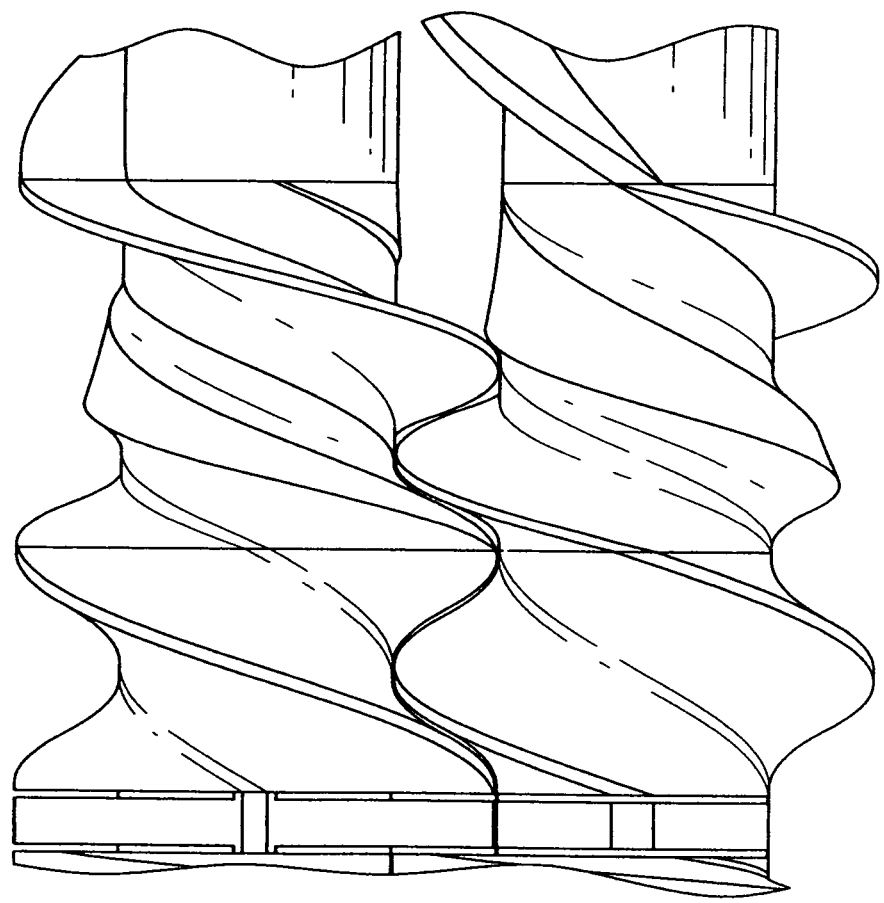
FIG. 16 is a partial assembly of a pair of transition screws.
Figure 17:
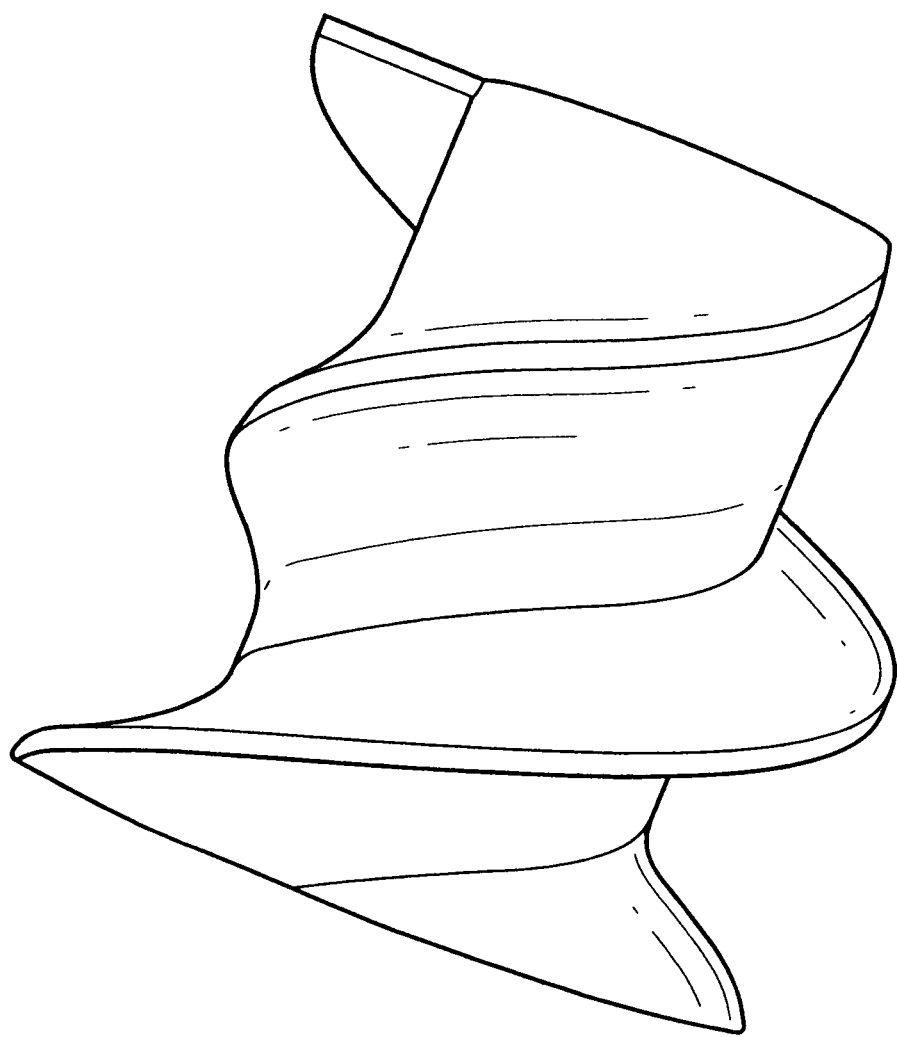
FIG. 17 is a side view of a single square to standard twin lead transition.

The instant invention deals with new and unique screws that create smooth transitions from the greater volume screws to the more traditional compression and energy creating screws in the processor. These transition screws eliminate the obstructions that typically plague the prior art screws with significant back flow of material and carry over of solids into the vents. These screw geometries create a smooth transition from the single lead half flight screws to the normal twin lead screws in a smooth and uniform transition, always forwarding the material during the transition phase, so that only the gas phase of the product is directed back to the vent openings, and not the particulate solids. The transition screws start out with the geometry of the open volume on one end and end up with the standard twin lead configuration on the other. This transition could easily be replicated from an open volume screw to a standard single lead screw (as shown in FIG. 13). However, there is no requirement for that type of transition in the current screw assembly. FIGS. 14 and 15, show the free flowing transition from the one face squared off single flight to the standard twin lead feed screw geometry and FIGS. 16 and 17 show the free flowing transition from the high volume total squared flight single flight to the standard twin lead feed screw respectively. The transition screws are approx. 0.75 diameters long but can be made in different length to diameter ratios if necessary, typically from 0.75 D to approx. 3 D long The lead is adjusted so that the transition will line up at 90 or 180 degree intervals to perfectly match the screw geometries of the mating screws at each end. For the application of carbonizing particulate solids, the practical limits of geometry for the transition screws can vary from 0.5 diameters to 2 diameters in length, and can vary in lead from 0.5 diameters to 2 diameters while changing configuration from the open to the more closed volume as shown in the attached Figures. An optimum length and lead is 0.75 long with a lead of 1.5 diameters. Thus the screw land will make 180 degrees of revolution in 0.75 diameters of length.

A typical volume change of the reactor due to the decrease in open area as the screw transitions is shown in FIG. 14A, for example. This example depicts a change of volume from the open single land to the compressing twin land in a screw with 360 degrees of revolution (0.75 D lead) over a length of 0.75 D. Likewise FIG. 14B depicts the same transition in a 0.75 D long screw, but with 180 degrees of revolution or a lead of 1.5 D. FIG. 14C depicts the same transition but over 2 diameters of length and at 360 degrees of rotation or a lead of 2 diameters. One can readily see that it is possible to change the severity of the transition by varying the parameters as outlined in this description of the invention.

Due to the fact that the feed port of the machine will accept material that is very low bulk density and has to compact it as well as forward the material, this screw section of the assembly contains a single flight with only one squared off face. This gives the screw extra strength for compacting the material as well as sustaining the screw integrity if, for instance, a hard object of foreign matter is accidentally fed into the system. The gas relief vents downstream utilize the more open volume screw with both sides of the single flight squared off, as they are only conveying material through the port area and require maximum open volume to let gas escape up the vents.

Figure 18:
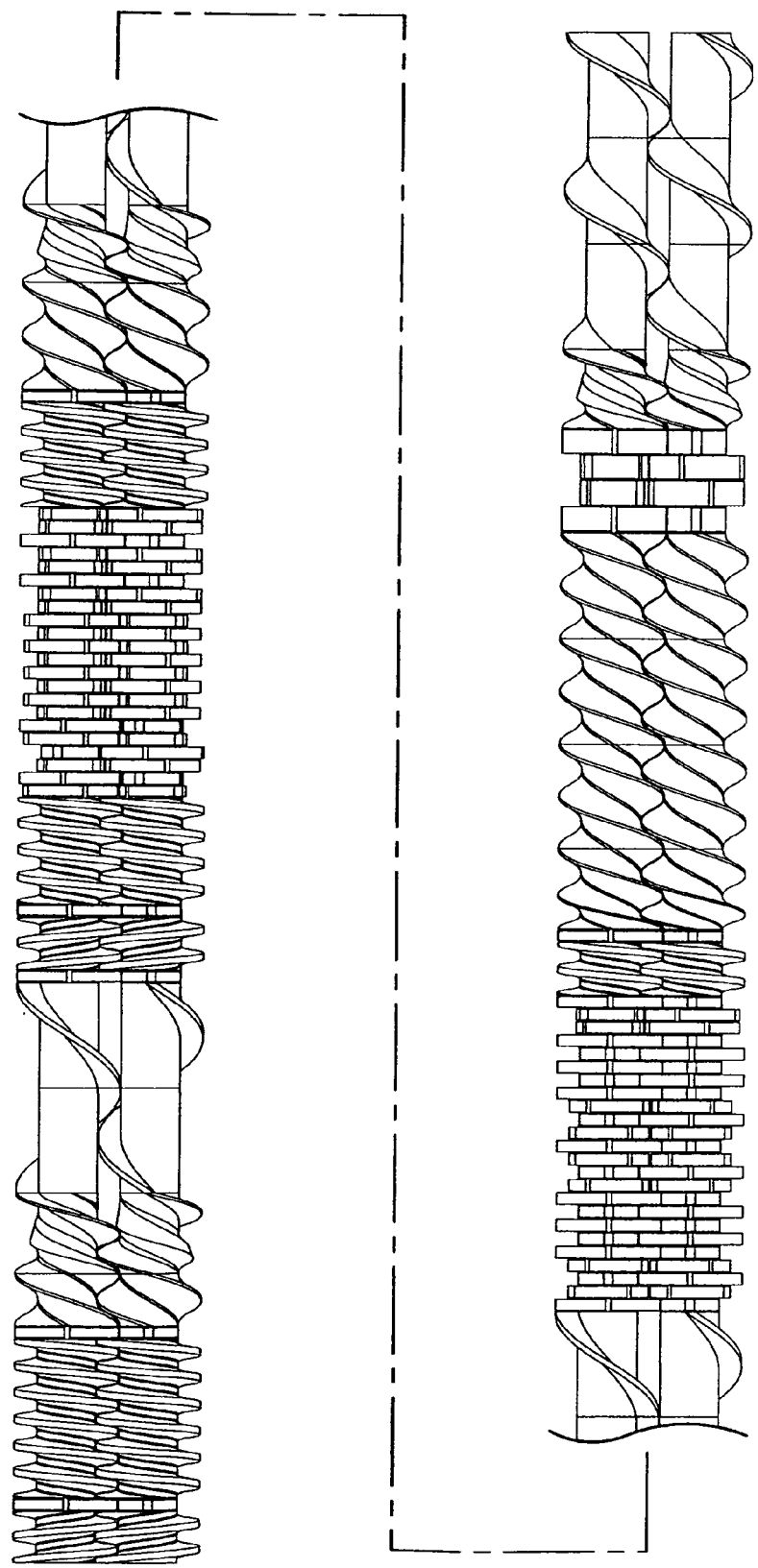
FIG. 18 is a full view assembly of the twin screws embodying this invention and a schematic of the inventive screws set forth herein, in a housing.

The complete assembly of the screw geometry with the unique sections designed for this process as described in this invention are shown in FIG. 18

What is claimed is:

1. A screw for a carbonizing machine, said screw comprised of a linear shaft comprised of a predetermined length and number of multiple sections, wherein each section in a system has a distinct configuration and orientation, each said section comprises:

a helical advancing screw configuration of a higher open volume than a standard helical screw to provide for additional venting capacity of said system at a lower gas velocity thereby increasing said system throughput rates while reducing solid carry over in any vents;

a helical screw configuration with a pitch that gradually reduces to form a change in volume to a lesser degree than said helical advancing screw configuration to minimize material backflow into said venting and increase said system capacity for throughput;

a standard helical screw;

a tight pitch single lead screw for initial compression of any material in the system;

a screw having radially abutting paddles that are progressively axially angularly out of phase with said screw linear shaft, and a screw having a reverse hand, wherein the multiple sections are maintained in a predetermined order.

2. In combination a screw as claimed in claim 1 wherein a first feed section is an open volume longer lead screw with a square face and reinforced back flight to increase the volumetric feed capacity of said system while being able to absorb high mechanical loading from new uncompressed raw material entering the screw.

3. In combination, two screws as claimed in claim 1 and a carbonizing machine.

* * * * *